(12) United States Patent
Hokeness

(10) Patent No.: US 11,150,640 B2
(45) Date of Patent: Oct. 19, 2021

(54) SYSTEMS AND METHODS FOR MANAGING ALERTS ASSOCIATED WITH DEVICES OF A PROCESS CONTROL SYSTEM

(71) Applicant: FISHER-ROSEMOUNT SYSTEMS, INC., Round Rock, TX (US)

(72) Inventor: Scott Nels Hokeness, Lakeville, MN (US)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 0 days.

(21) Appl. No.: 16/863,839

(22) Filed: Apr. 30, 2020

(65) Prior Publication Data
US 2020/0257279 A1 Aug. 13, 2020

Related U.S. Application Data

(63) Continuation of application No. 15/928,354, filed on Mar. 22, 2018, now Pat. No. 10,725,464.

(51) Int. Cl.
*G05B 23/02* (2006.01)
*G06F 16/00* (2019.01)
*G05B 19/41* (2006.01)

(52) U.S. Cl.
CPC .................. *G05B 23/027* (2013.01)

(58) Field of Classification Search
CPC ...... G06F 16/00; G06F 11/14; G06F 17/2872; G06F 16/23; G06F 16/2379; G05B 19/41835; G05B 19/41865; G05B 19/41875; G05B 23/0297

USPC .................................. 700/80, 108, 173, 174
See application file for complete search history.

(56) References Cited

U.S. PATENT DOCUMENTS

| 8,996,449 B2 * | 3/2015 | Power ................. G05B 19/042 707/601 |
| 9,176,803 B2 * | 11/2015 | Biberdorf ........... G06F 11/3495 |
| 2002/0147511 A1 | 10/2002 | Eryurek et al. |

FOREIGN PATENT DOCUMENTS

| GB | 2 377 070 A | 12/2002 |
| GB | 2 426 355 A | 11/2006 |
| GB | 2 532 848 A | 6/2016 |

OTHER PUBLICATIONS

Search Report for Application No. GB1903846.2, dated Sep. 20, 2019.

* cited by examiner

*Primary Examiner* — Michael J Brown
(74) *Attorney, Agent, or Firm* — Marshall, Gerstein & Borun LLP

(57) ABSTRACT

Techniques for managing alerts associated with devices of a process control system in a process plant are described. According to certain aspects, a set of devices may generate and communicate a set of alerts to an asset management system, which can examine the set of alerts and determine whether a rule(s) is applicable. In embodiments, the rule may specify how the set of alerts should be stored as well as an action(s) to initiate in response to storing the set of alerts. The asset management system may further automatically generate new rules to be applied to alerts of the devices, to further refine the management of the alerts.

21 Claims, 7 Drawing Sheets

SYSTEMS AND METHODS FOR MANAGING ALERTS ASSOCIATED WITH DEVICES OF A PROCESS CONTROL SYSTEM

CROSS-REFERENCE TO RELATED APPLICATIONS

This application is a continuation of U.S. patent application Ser. No. 15/928,354, filed Mar. 22, 2018, which is fully incorporated by reference in its entirety.

FIELD OF THE TECHNOLOGY

This disclosure relates generally to alerts associated with devices or assets in a process control system and, in particular, to effectively and efficiently implementing and operating a management system to effectively and efficiently manage alerts generated by the devices or assets.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via one or more wireless communication links or networks. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature, flow, or pressure, etc., to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system, e.g., to control at least a portion of one or more industrial processes running or executing within the plant or system. I/O devices, which are also typically located within the plant environment, are disposed between a controller and one or more field devices, and enable communications there between, e.g., by converting electrical signals into digital values and vice versa. As utilized herein, field devices, controllers, and I/O devices are generally referred to as "process control devices," and are generally located, disposed, or installed in a field environment of a process control system or plant.

Still further, in many process or industrial plants, the process control network includes a safety instrumented system (SIS) which operates to detect significant safety related problems within the process plant and to automatically close or open valves, remove power from devices, switch flows within the plant, etc., when a problem occurs which might result in or lead to a serious hazard in the plant, such as a spill of toxic chemicals, an explosion, etc. These safety systems typically have one or more separate controllers apart from the standard process control controllers, called safety system logic solvers, which are connected to safety field devices via separate buses, communication lines, or wireless networks installed within the process plant. The logic solvers execute safety instrumented function (SW) routines that use the safety field devices to detect process conditions associated with significant events, such as the position of certain safety switches or shutdown valves, overflows or underflows in the process, the operation of important power generation or control devices, the operation of fault detection devices, etc., to thereby detect events within the process plant. When an event, which may be a single condition or the simultaneous occurrence of two or more conditions, is detected, the safety controller takes some action to limit the detrimental nature of the event, such as closing valves, turning devices off, removing power from sections of the plant, etc. Generally, these actions include switching safety devices into a tripped or "safe" mode of operation which is designed to prevent a serious or hazardous condition within the process plant.

In both cases, information from the field devices, the controllers, and the safety system logic solvers (also called safety controllers) is usually made available over a data highway or communication network to one or more other hardware devices, such as operator workstations, personal computers or other types of computing devices with user interfaces, data historians, report generators, centralized databases, or other centralized administrative computing devices that are typically placed in control rooms or other locations away from the harsher field environment of the plant, e.g., in a back-end environment of the process plant. Each of these hardware devices typically is centralized across the process plant or across a portion of the process plant. These hardware devices run applications that may, for example, enable a control or a safety system operator to perform functions with respect to controlling a process and/or operating the process plant, such as changing settings of the process control routine or a safety routine, modifying the operation of the control modules within the process controllers, the safety system controllers, the field devices, etc., viewing the current state of the process, viewing alerts or alarms generated by field devices, the process controllers, or the safety system controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices in a back-end environment of a process control system or plant, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller (such as the process controllers and the safety system controllers) and, in some cases, one or more field devices, stores and executes a respective controller or safety application that runs the control modules assigned and downloaded thereto to implement actual process control and safety system functionality.

Moreover, one or more user interface devices, or plant display applications which may be executed on one or more user interface devices, such as operator workstations, one or more remote computing devices in communicative connection with the operator workstations and the data highway, etc., receive data from the controllers and the field devices via the data highway and display this data to process control system designers, operators, or users via a user interface screen. These user interface devices or applications may provide any of a number of different views, such as an operator's view, an engineer's view, a technician's view, etc. tailored to actions performed by different users in the plant. Moreover, a data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

One of the important activities performed by control and or safety system operators, maintenance system operators, etc., relates to viewing and responding to alerts and alarms that are generated by the various devices, control routines, safety system routines, maintenance routines, etc., during operation of the plant. Generally, process control operators, safety system operators, maintenance personnel, etc., view a user interface display screen provided by a user interface application that is executed on a workstation, a handheld device, etc., generally within the back-end environment of the plant away from the actual field devices and other field equipment within a field environment of the plant. During the operation, the user interface application may present one of a number of possible preconfigured plant displays to the user, wherein each plant display typically depicts some area, unit, section, or other part of the plant. As is commonly known, physical process elements (such as valves, sensors, etc., that are to be utilized to control a process in a process plant) may be depicted in accordance with Piping and Instrumentation Diagrams (P&IDs) and/or other plans or "blueprints" of the plant floor layout and/or of the process control system or the safety system layout. Additionally, these user interface applications typically display a banner or other display that indicates some or all of the various alerts or alarms that have been generated or initiated by devices and logic modules within the plant. The banner typically depicts an icon associated with each alert or alarm that has been initiated within the plant, and these icons may be organized, color coded, displayed as solid or blinking icons, etc., based on a severity, priority, location, or other criteria, of the alert or alarm or of the source of the alert or alarm.

Generally, process plants incorporate hundreds, if not thousands, of devices that control and monitor production processes. Each of these devices is capable of generating several alerts every day. Additionally, many alerts may be extraneous (e.g., such as an alert for an empty pipe that is not being used) or otherwise not cause real problems. Moreover, some devices that are not critical to the process and that are in alert may not have an urgency for repair, and may thus be placed on a list to be repaired at the next scheduled outage or plant turnaround, but may continue to generate alerts. For at least these reasons, managing the alerts is time consuming and difficult. Accordingly, there is an opportunity for systems and methods to efficiently and effectively manage alerts associated with process control systems.

SUMMARY

Systems and methods for managing alerts associated with a process control system of a process plant are disclosed. During operation of the process control system, a set of process control devices may generate alerts and transmit the alerts to a computing device such as a workstation. The computing device may examine the alerts and determine whether a rule applies to the alert(s) or whether a new rule should be established. Generally, a rule may specify a storage location which with alert(s) may be associated. If a rule applies to a received alert, the computing device may associated the alert with a storage location specified by the rule. Alternatively, the computing device may establish a new rule to be applied to subsequent alerts received from the device.

In an embodiment, a computer-implemented method of managing alerts associated with a set of devices in a process plant is provided, where at least some of the set of devices are communicatively connected to operate in the process plant during run-time to enable a process control system of the process plant to control a set of processes. The method may include: receiving, at a computing device from a device of the set of devices, an alert associated with operation of the device in the process plant; accessing, from memory, a set of rules for managing alerts, wherein a rule of the set of rules (i) is applicable to the alert, and (ii) specifies a storage location; associating the alert with the storage location, wherein one or more of the rule and the storage location specifies an action to initiate; and in response to associating the rule with the storage location, initiating the action.

In another embodiment, a management system for managing alerts associated with a set of devices in a process plant is provided, where the system is communicatively connected to the set of devices, and where at least some of the set of devices are communicatively connected to operate in the process plant during run-time to enable a process control system of the process plant to control a set of processes. The system may include a memory (i) at least partially segmented into a set of storage locations, and (ii) storing a set of rules for managing alerts; and a processor interfacing with the memory, and configured to: receive, from a device of the set of devices, an alert associated with operation of the device in the process plant, access the set of rules from the memory, wherein a rule of the set of rules (i) is applicable to the alert, and (ii) specifies a storage location of the set of storage locations, associate, in the memory, the alert with the storage location, wherein one or more of the rule and the storage location specifies an action to initiate, and in response to associating the rule with the storage location, initiate the action.

In a further embodiment, a computer-implemented method of generating rules for managing alerts associated with a set of devices in a process plant is provided, where at least some of the set of devices are communicatively connected to operate in the process plant during run-time to enable a process control system of the process plant to control a set of processes. The method may include: receiving, at a computing device from a device of the set of devices, an alert associated with operation of the device in the process plant; determining, from the alert, that a new rule should be established for the device; establishing the new rule for the device, wherein the new rule specifies a storage location for alerts associated with operation of the device; receiving, at the computing device from the device, a subsequent alert associated with operation of the device; and after receiving the subsequent alert, associating the subsequent alert with the storage location specified by the new rule.

In a still further embodiment, a management system for managing alerts associated with a set of devices in a process plant is provided, where the system is communicatively connected to the set of devices, and where at least some of the set of devices are communicatively connected to operate in the process plant during run-time to enable a process control system of the process plant to control a set of processes. The system may include a memory (i) at least partially segmented into a set of storage locations, and (ii) storing a set of rules for managing alerts; and a processor interfaced with the memory, and configured to: receive, from a device of the set of devices, an alert associated with operation of the device in the process plant, determine, from the alert, that a new rule should be established for the device, establish the new rule for the device, wherein the new rule specifies a storage location for alerts associated with operation of the device, receive, from the device, a subsequent alert associated with operation of the device, and after receiving the subsequent alert, associate, in the memory, the subsequent alert with the storage location specified by the new rule.

Still another embodiment of these techniques is a computing devices including one or more processors and a non-transitory computer-readable medium storing instructions that implement the functionalities as described herein.

DETAILED DESCRIPTION

Figure 1:
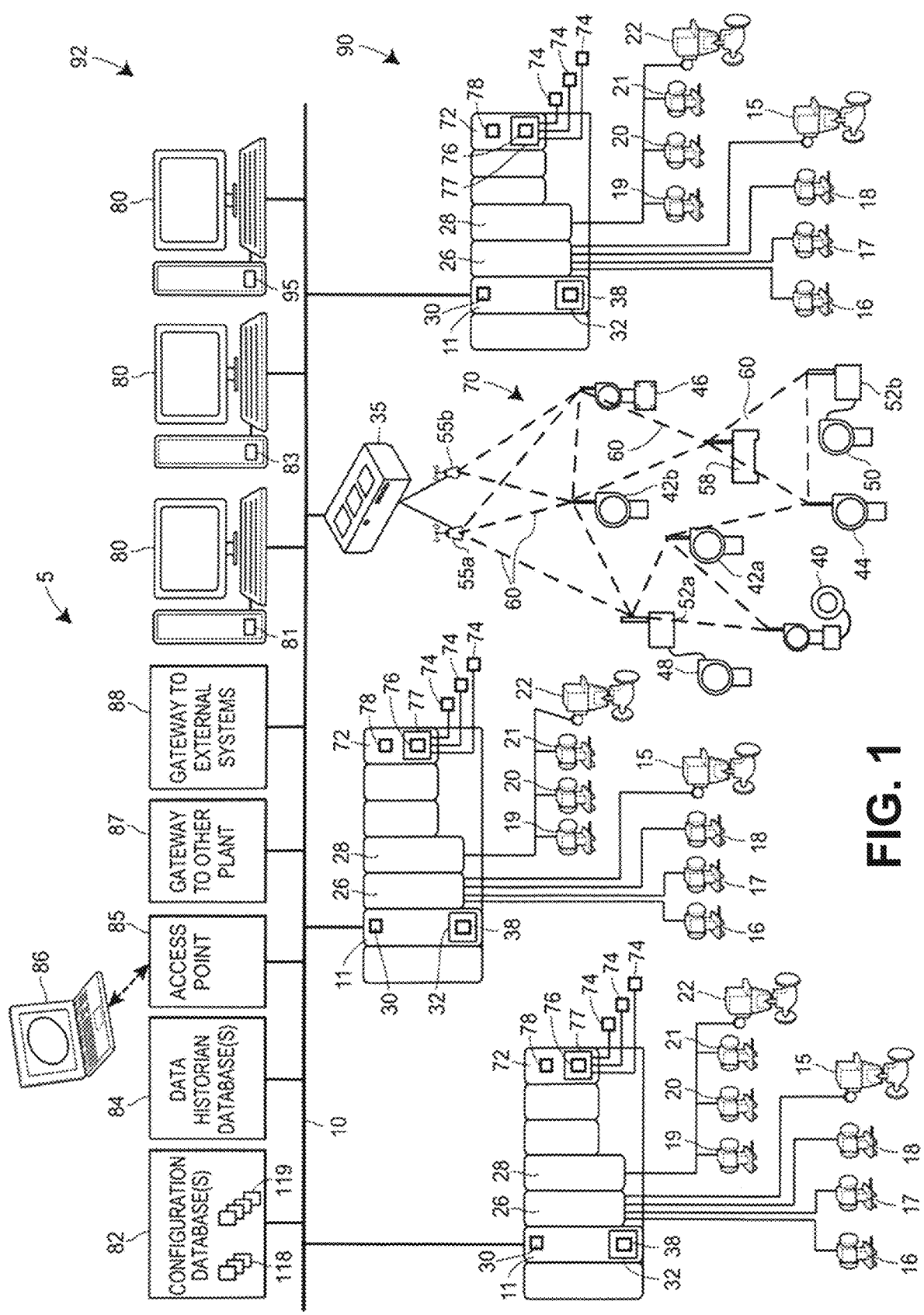
FIG. 1 is a block diagram of a process control system in which the alarm management functionalities may be implemented, according to certain embodiments.

Process control systems of process plans may be configured with a plurality of process control devices that may be configured to generate alerts associated with operation and conditions of or detected by the process control devices. The alerts may serve to notify users of potential device issues so that the users may review the alerts to assess any potential impacts of the alerts and/or undertake corrective actions.

Generally, an alert may be different from (or considered a type of) an alarm, where an alert, as discussed herein, may be intended for an operator who typically oversees or manages a process plant. In contrast, an alarm is typically intended for a technician or maintenance personnel who is tasked with directly addressing issues, such as repairing or maintaining devices. Thus, alerts and alarms may be generated, managed, and addressed in different manners.

Alerts, as discussed herein, may relate to hardware failures, sensor or control problems, responsive or proactive reporting of past or upcoming maintenance requirements, and/or the like. Alerts may be of different types and have different degrees of severity. For example, an alert may have one of the following types: "failed," "maintenance," "advisory," and "communication"; and an alert may have one of the following degrees of severity: low, medium, and high.

The present embodiments describe an alert management system configured to communicate with process control devices of a process plant. The alert management system is configured to automatically manage alerts generated by and received from the process control devices according to a set of storage locations. In particular, received alerts may be automatically mapped to certain storage locations based on the source process control device, the severity or criticality of the alert, or both.

According to embodiments, the alert management systems and methods may additionally implement certain actions when mapping alerts to storage locations. For example, low priority alerts may be removed from an active device alert list. For further example, high priority alerts may trigger an email or other communication to be transmitted to appropriate personnel. In an implementation, the alert management systems and methods may automatically and autonomously generate and implement new rules for the mapping of alerts and/or devices to storage locations, based on certain criteria. In an additional or alternative implementation, the system may enable a user to specify rules for mapping alerts and/or devices to storage containers.

The systems and methods therefore offer numerous benefits. In particular, the systems and methods effectively and efficiently manage alerts generated by process control devices, so as to reduce the amount of alerts that are presented to process plant personnel. This reduces the amount of time and effort that the personnel need to spend on addressing alerts. Additionally, the systems and methods automatically generate new rules and alert mappings based on monitoring conditions and operations within the process plant, thus further refining operation of the alert management system. It should be appreciated that additional benefits are envisioned.

FIG. 1 illustrates a process plant, process control system, or process control environment 5 that may operate to control one or more industrial processes in real-time and in which an alert management system may be implemented to provide enhanced alert management capabilities within the control system or plant 5. Generally speaking, the process plant 5, when commissioned and operating on-line, includes one or more wired or wireless process control devices, components, or elements that perform physical functions in concert with a process control system that controls one or more processes executing within the process plant (which may be any type of process or industrial plant). The process plant 5 and/or process control system may include, for example, one or more wired communication networks and/one or more wireless communication networks. Additionally, the process plant 5 or control system may include centralized databases, such as continuous, batch, asset management, configuration, historian, and other types of databases.

In particular, FIG. 1 depicts a block diagram of an example process plant, process control system, or process control environment 5 having one or more process controllers and safety controllers that receive signals indicative of process measurements made by field devices, that process this information using one or more process control and/or safety system control routines which generate control signals that are sent over wired or wireless process control communication links or networks to other field devices to control the operation of a process in the plant 5. Typically, at least one field device performs a physical function (e.g., opening or closing a valve, increasing or decreasing a temperature, taking a measurement, sensing a condition, etc.) to control the operation of a process. Some types of field devices communicate with controllers using input/output (I/O) devices. Process controllers, field devices, and I/O devices may be wired or wireless, and any number and combination of wired and wireless process controllers, field devices and I/O devices may be included in the process plant environment or system 5.

For example, the system of FIG. 1 depicts a control system having multiple process controllers 11, in which some of the process controllers 11 are communicatively connected to field devices 15-22 via input/output (I/O) cards 26 and 28 in a wired manner. Moreover, some of the process controllers 11 are communicatively connected in a wireless manner or partially wireless manner to field devices 40-46 via a wireless gateway 35 and a process control data highway 10. The process control data highway 10 may include one or more wired and/or wireless communication links, and may be implemented using any desired or suitable or communication protocol such as, for example, an Ethernet protocol. In some configurations (not shown), one or more of the process controllers 11 may be communicatively connected to the wireless gateway 35 using one or more communications networks other than the data highway or communication network 10, such as by using any number of other wired or wireless communication links that support any other communication protocols, e.g., Wi-Fi or other IEEE 802.11 compliant wireless local area network protocols, mobile communication protocols (e.g., WiMAX, LTE, or other ITU-R compatible protocol), the Bluetooth® protocol, the HART® protocol, the WirelessHART® protocol, the Profibus protocol, the FOUNDATION® Fieldbus protocol, etc.

The controllers 11, which may be, by way of example, DeltaV™ controllers sold by Emerson Process Management, may operate to implement a batch process or a continuous process using at least some of the field devices 15-22 and 40-46. In addition to being communicatively connected to the process control data highway 10, the controllers 11 may be communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1, the controllers 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controllers 11 of FIG. 1 each define a separate node of the process control system and include a processor 30 that implements or oversees one or more process control routines 38 (e.g., that are stored in a memory 32), with such process control routines 38 generally being referred to herein as control modules. The processor 30 is configured to communicate with the field devices 15-22 and 40-46 and with other nodes communicatively connected to the controllers 11. It should be noted that any control routines or modules 38 described herein may have parts thereof implemented or executed by different controllers or other devices if so desired. Likewise, the control routines or control modules 38 described herein which are to be implemented within the process control system 5 may take any form, including software, firmware, hardware, etc. Additionally, the control routines 38 may be implemented in any desired software format, such as using object oriented programming, ladder logic, sequential function charts, function block diagrams, or using any other software programming language or design paradigm. The control routines or control modules 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controllers 11 may be configured to implement a control strategy or control routine in any desired manner.

In one case, the controllers 11 implement a control strategy using control modules 38 defined by what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controllers 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. Thus, as will be understood, the controllers 11 may include one or more control routines 38 that may implement one or more control loops which are performed by executing one or more of the function blocks.

The wired field devices 15-22 may be any type of device, such as sensors, valves, transmitters, positioners, etc., while the I/O cards 26 and 28 may be any types of I/O devices conforming to any desired communication or controller protocol. In FIG. 1, the field devices 15-® are standard 4-20 mA devices or HART® devices that communicate over analog lines or combined analog and digital lines to the I/O cards 26, while the field devices 19-22 are smart devices, such as FOUNDATION® Fieldbus field devices, that communicate over a digital bus to the I/O cards 28 using a FOUNDATION® Fieldbus communications protocol. In some embodiments, though, at least some of the wired field devices 15-22 and/or at least some of the I/O cards 26, 28 additionally or alternatively may communicate with the controllers 11 using the process control data highway 10 and/or by using other suitable control system protocols (e.g., Profibus, DeviceNet, Foundation Fieldbus, ControlNet, Modbus, HART, etc.).

In the system of FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize the wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other communications networks of the process plant 5.

Similar to the wired field devices 15-22, the wireless field devices 40-46 of the wireless network 70 perform physical control functions within the process plant 5, e.g., opening or closing valves, taking measurements of process parameters, etc. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 is depicted as a legacy 4-20 mA device and a field device 50 is depicted as a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In the example system of FIG. 1, the wireless devices 40-46 and 52-58 communicate with each other and with the wireless gateway 35 over wireless links 60 of the wireless communications network 70, and/or via the process control data highway 10.

Still further, one or more of the process controllers 11 may be connected to safety logic solvers or safety system controllers 72, which, in turn, are connected to safety system field devices or assets 74. The safety controllers 72 may be connected directly to the field devices 74 (as shown in FIG. 1) or may be connected to the field devices 74 via one or more I/O devices (not shown in FIG. 1) and, in any event, may be connected to the field devices 74 via any wired or wireless communication links. Likewise, the field devices 74 may be any types of devices that perform any type of physical function or sensing function within the plant for safety purposes, and may conform to any of the communication protocols described above or other communication protocols. Likewise, the safety controllers 72 may store one or more safety system logic modules 76, referred to herein as safety system modules, in a memory 77, and may execute these safety system modules 76 on a processor 78. The safety system logic modules 76 may be configured in any of the manners described above for the process control modules 38 and may perform any desired functions within the safety system, including user interface functions such as alerting and alarming functions. If desired, the safety logic controllers 72 may be in the same or different nodes as the process controllers 11.

The process plant or the process control system 5 of FIG. 1 also includes one or more operator workstations 80, each of which is communicatively connected to the data highway 10, and each of which includes a memory and one or more computer processors. Operators and other personnel may use the operator workstations 80 to configure the plant 5 and elements within the plant 5 and/or to view and monitor run-time operations of the process plant 5, as well as take any diagnostic, corrective, maintenance, and/or other actions that may be required. At least some of the operator workstations 80 may be located in various, protected areas in or near the plant 5, and in some situations, at least some of the operator workstations 80 may be remotely located, but nonetheless in communicative connection with the plant 5. The operator workstations 80 may be wired or wireless computing devices.

The example process control system 5 is further illustrated as including a configuration application 81 (stored in a memory of and executed on a processor of at least one of the operator workstations 80) and a configuration database 82, each of which is also communicatively connected to the data highway 10. As discussed above, various instances of the configuration application 81 may execute on one or more computing devices to enable users to create or change process control modules (38) and/or safety system modules (76), to configure alert management and viewing routines and support mechanisms, and to download these modules and support mechanisms via the data highway 10 to the controllers 11, the safety logic devices 72, or other nodes of the process plant 5, as well as enable users to create or change operator interface display modules executed on operator interface devices via which an operator is able to view the process plant 5, view data, and change data settings within the process control routines 38, the safety system routines 76, the field devices 15-22 and 40-58 of the plant 5, etc. The configuration database 82 stores the created (e.g., configured) control and safety system modules and/or operator interface display modules or routines. If desired, the configuration application 81 and the configuration database 82 may be centralized and have a unitary logical appearance to the process control system 5, although multiple instances of the configuration application 81 may execute simultaneously within the process control system 5, and the configuration database 82 may be implemented across multiple physical data storage devices. If desired, the user interface display devices for the configuration system may be different than the operator workstations 80, as the user interface device for the configuration system are utilized by configuration and development engineers irrespective of whether or not the plant 5 is operating in real-time, whereas the operator workstations 80 are generally utilized by control and safety system operators during real-time operations of the process plant 5 (also referred to interchangeably herein as "runtime" operations of the process plant 5).

The example process control system 5 also include a data historian application 83 and a data historian database 84, each of which is also communicatively connected to the data highway 10. The data historian application 83 operates to collect some or all of the data provided across the data highway 10, and to historize or store the data in the historian database 84 for long term storage. Similar to the configuration application 81 and the configuration database 82, the data historian application 83 and the historian database 84 may be centralized and have a unitary logical appearance to the process control system 5, although multiple instances of a data historian application 83 may execute simultaneously within the process control system 5, and the data historian database 84 may be implemented across multiple physical data storage devices.

In some configurations, the process control system 5 includes one or more other wireless access points 85 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 85 allow handheld or other portable computing devices (e.g., user interface devices 86) to communicate over a respective wireless process control communication network that may be different from the wireless network 70 and that may support a different wireless protocol than the wireless network 70. For example, the wireless or portable user interface device 86 may be a mobile workstation or diagnostic test equipment that is utilized by an operator or by maintenance personnel within the process plant 5 (e.g., an instance of one of the operator workstations 80). In some scenarios, in addition to portable computing devices, one or more process control devices (e.g., the controllers 11, the field devices 15-22, or wireless devices 40-58) also communicate using the wireless protocol supported by the access points 85.

In some configurations, the process control system 5 includes one or more gateways 87, 88 to systems that are external to the immediate process control system 5. Typically, such systems may be provided for consumers or suppliers of information generated by or operated on by the process control system 5. For example, the process control plant 5 may include a gateway node 87 to communicatively connect the immediate process plant 5 with another process plant. Additionally or alternatively, the process control plant 5 may include a gateway node 88 to communicatively connect the immediate process plant 5 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 1 only illustrates three controllers 11 with a finite number of field devices 15-22 and 40-46, wireless gateways 35, wireless adaptors 52, access points 55, routers 58, wireless process control communications networks 70, safety system logic devices 72, and safety system field devices 74 included in the example process plant 5, this example is only an illustrative and non-limiting embodiment. Any number of controllers 11 and/or safety logic devices 72 may be included in the process control plant or system 5, and any of the controllers 11 and safety logic devices 72 may communicate with any number of wired or wireless devices and networks 15-22, 40-46, 35, 52, 55, 58, 70, and 74 to control a process in the plant 5.

Further, it is noted that the process plant or control system 5 of FIG. 1 includes a field environment 90 (e.g., the process plant floor) and a back-end environment 92 which are communicatively connected by the data highway 10. As depicted in FIG. 1, the field environment 90 includes physical components (e.g., process control devices, field devices, I/O networks, network elements, etc.) that are disposed, installed, and interconnected therein to operate to control the process during run-time. For example, the controller 11, the I/O cards 26, 28, the field devices 15-22, and other devices and network components 40-46, 35, 52, 55, 58, 70 and the safety logic solvers 72 and safety devices 74 are located, disposed, or otherwise included in the field environment 90 of the process plant 5. Generally speaking, in the field environment 90 of the process plant 5, raw materials are received and processed using the physical components disposed therein to generate one or more products.

The back-end environment 92 of the process plant 5 includes various components such as computing devices, operator workstations, databases or databanks, etc., that are typically shielded and/or protected from the harsh conditions and materials of the field environment 90. As illustrated in FIG. 1, the back-end environment 92 includes, for example, the operator workstations 80, the configuration or development systems 81, 82 for control modules and other executable modules, the data historian systems 83, 84, and/or other centralized administrative systems, computing devices, and/or functionality that support the run-time operations of the process plant 5. In some configurations, various computing devices, databases, and other components and equipment included in the back-end environment 92 of the process plant 5 may be physically located at different physical locations, some of which may be local to the process plant 5, and some of which may be remote.

Figure 2:
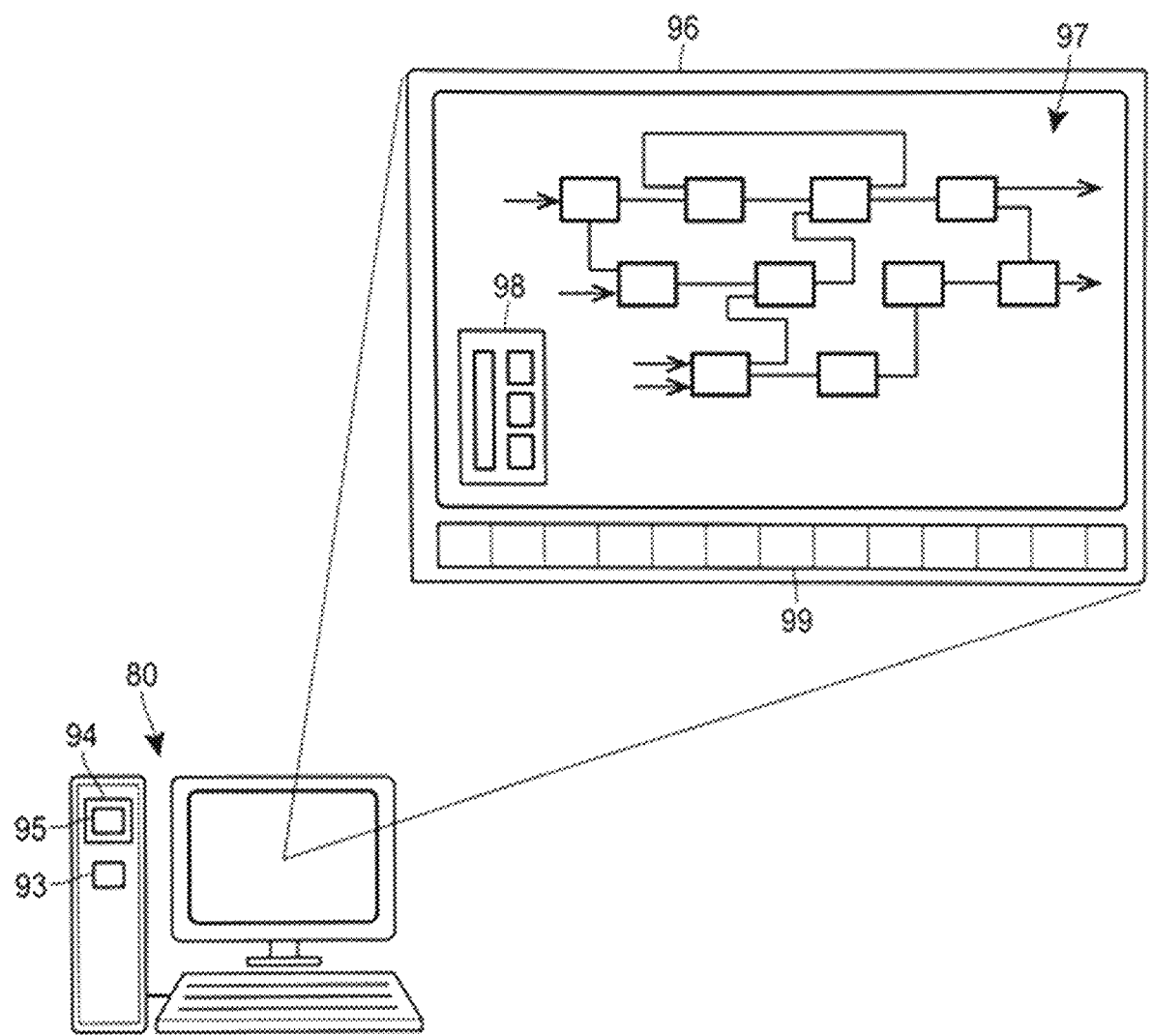
FIG. 2 depicts a display application executed on an operator workstation that presents a user display interface illustrating aspects of alarm management, according to certain embodiments.

During operation of the plant 5, as illustrated in FIG. 1, one or more of the operator workstations 80 may implement a user interface application 95 that provides a user, such as a control system operator, with a view of various equipment and data associated with the equipment. FIG. 2 illustrates one of the operator interfaces 80 of FIG. 1 as including a computer processor 93 and a memory 94 which stores a user interface display program or application 95 that executes on the processor 93 to provide a user with one or more plant display views and/or faceplate display views to assist the user in performing day-to-day operations, such as managing the plant, viewing the current state of equipment in the plant, etc. One such plant display view 96 is illustrated in FIG. 2 and presents a user with a view of the plant operation in the form a plant layout view or plant display 97. The plant display 97 may be based on a PI&D diagram and may depict various icons or other representations of devices such as valves, tanks, transmitters (e.g., sensors) as interconnected within the plant 5, and may depict various important parameters and values such as device tags or names, control system references or logic, measured process parameter values, etc. The plant displays 97 may include user interaction features or elements that allow a user to interact with the graphical elements of the display 97 to view additional information, to navigate to other plant displays 97, to view other informational views (such as pop-up windows) regarding elements or parameters in the graphical display, etc. The plant display view 96 may also or instead include one or more faceplate displays 98 for various devices (such as controllers, I/O devices, field devices, etc.), modules (such as control or safety system modules) or other containers within the plant 5. Faceplate displays generally provide some information about a device and/or a module, such as a standard icon for the device or module, a tag, a name, a description, a manufacturer, a device type, one or more values for significant parameters associated with the device or module, etc. Additionally, the user interface display application 95 may present a banner 99 or other display that may display icons of various alerts that have been generated or received (and in some cases, that are active) within the plant 5 or portions of the plant 5.

Figure 4:
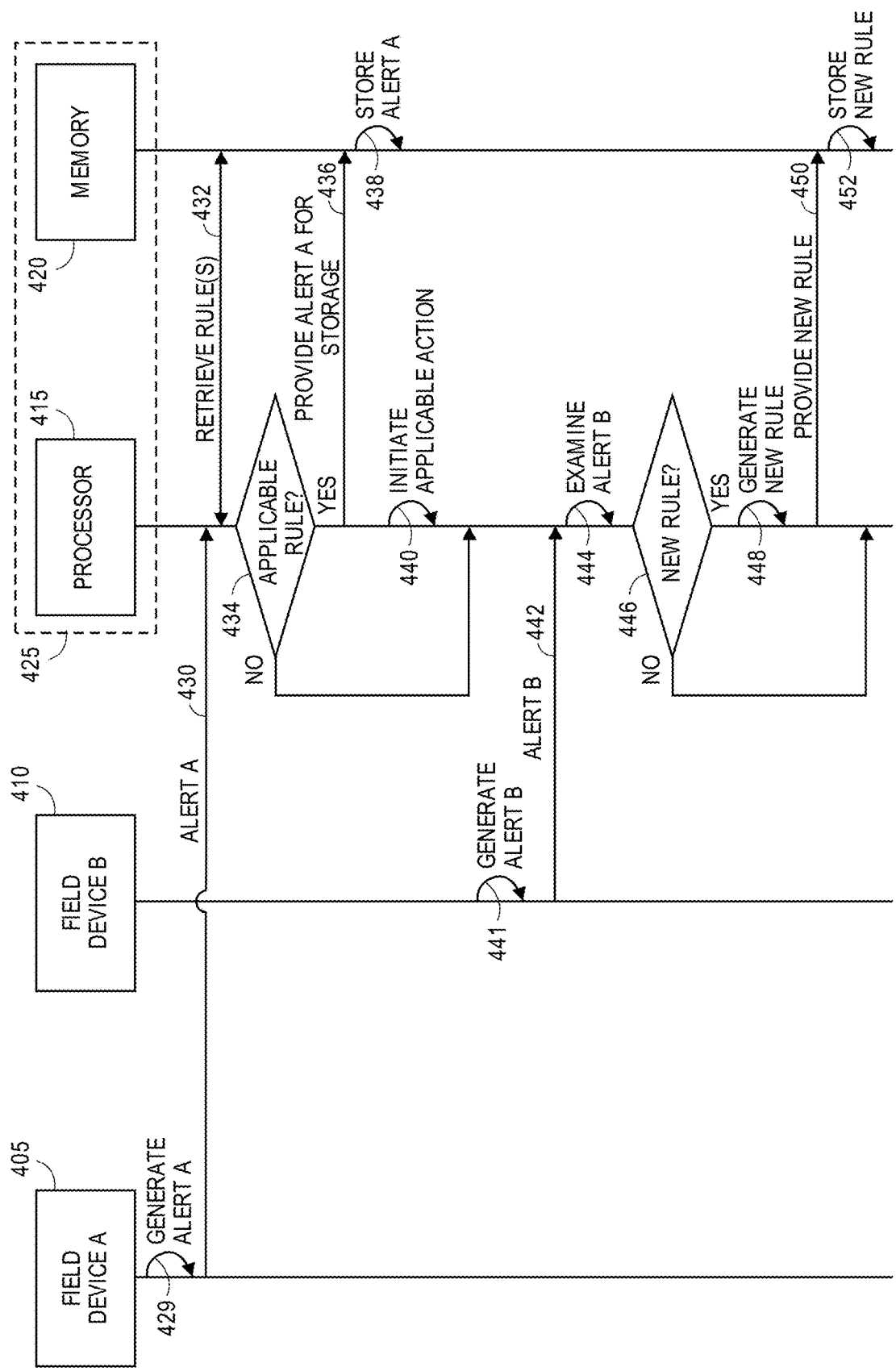
FIG. 4 is a signal diagram associated with managing alerts of a process control system, according to certain embodiments.

During operation of the plant display application or program 95, the user may use the display view 96 to view various different plant displays (as generated by and associated with different plant display modules or interface modules stored in the configuration database 82 of FIG. 1 for example), wherein each of the plant displays has graphical information that depicts various different equipment, sections, control routines, etc. of the plant 5. The user may manipulate the display view 96 in standard manners to view detailed graphical displays of the same or different sections or parts of the plant 5, to view control system displays (illustrating control logic, for example), etc. The user may also select various elements in the display view 96 to view one or more faceplate displays 98 that provide additional information about those elements. In some cases, the faceplate displays 98 may enable the user to change the values of one or more significant parameters of the element. Likewise, the user may select an icon for one of the alerts in the banner 99 and the plant display application 95 will automatically provide a prefigured plant display associated with that alert. Generally, the plant display application 95 may, upon the selection of an alert, communicate with the container (e.g., a device or module) that generated the alert to obtain information regarding the plant display, faceplate display, and other information to use or to present to the user in the display view 96 for the selected alert. Generally, a container may be a physical device, such as a field device, an I/O device, etc., or a logical module executed on a processor, such as a process control module, a safety system logic module, etc., or any other entity that generates an alert. FIG. 4 describes more detailed functionalities associated with the alert management systems and methods.

Figure 3:
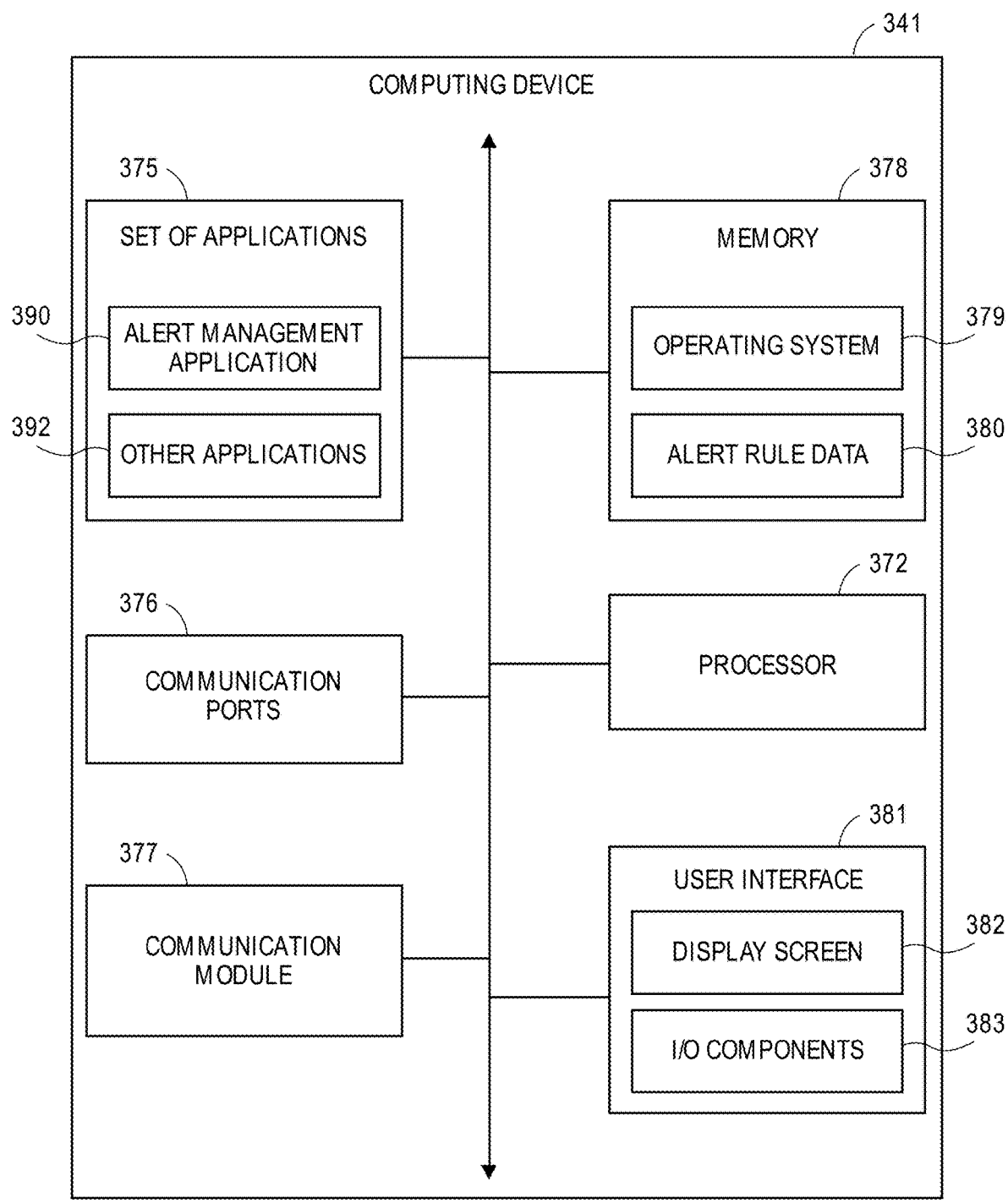
FIG. 3 is a hardware diagram of an example computing device, according to certain embodiments.

FIG. 3 illustrates a hardware diagram of an example computing device 341 (such as the workstation 80 as discussed with respect to FIG. 1) that may interface with devices of the field environment 90, and in which the functionalities as discussed herein may be implemented. According to embodiments, the computing device 341 may be any type of computing device configured to interface and communicate with the devices, such as a laptop computer, desktop computer, tablet device, smartphone, smartwatch, smart glasses, or the like.

The computing device 341 may include a processor 372 as well as a memory 378. The memory 378 may store an operating system 379 capable of facilitating the functionalities as discussed herein as well as a set of applications 375 (i.e., machine readable instructions). For example, one of the set of applications 375 may be an alert management application 390 configured to facilitate management of alerts received from devices. It should be appreciated that one or more other applications 392 are envisioned.

The processor 372 may interface with the memory 378 to execute the operating system 379 and the set of applications 375. According to some embodiments, the memory 378 may also store alert rule data 380 that may include rules specifying how alerts should be segmented or stored. In embodiments, the memory 378 may be segmented to store alerts according to the rules of the alert rule data 380, such that the alerts may be accessed, modified, deleted, and/or the like. The memory 378 may include one or more forms of volatile and/or non-volatile, fixed and/or removable memory, such as ROM, EPROM, RAM, EEPROM, and/or other hard drives, flash memory, memory cards, and others.

The computing device 341 may further include a communication module 377 configured to interface with devices of the field environment 90, via a wired connection or via one or more wireless networks. According to some embodiments, the communication module 377 may include one or more transceivers (e.g., WWAN, WLAN, and/or WPAN transceivers) functioning in accordance with IEEE standards, 3GPP standards, or other standards, and configured to receive and transmit data via one or more communication ports 376.

The computing device 341 may further include a user interface 381 configured to present information to a user and/or receive inputs from the user. As shown in FIG. 3, the user interface 381 may include a display screen 382 and I/O components 383 (e.g., ports, capacitive or resistive touch sensitive input panels, keys, buttons, lights, LEDs). According to some embodiments, the user may access the computing device 341 via the user interface 381 to review information (e.g., alert information), make selections, and/or perform other functions.

In some embodiments, the computing device 341 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 372 (e.g., working in connection with the operating system 379) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

FIG. 4 depicts an example signal diagram 400 associated with managing alerts generated by devices within a process control system of a process plant. The signal diagram 400 may include a field device A 405 (such as one of the field devices as discussed with respect to FIG. 1), a field device B 410 (such as one of the field devices as discussed with respect to FIG. 1), a processor 415, and a memory 420. In an implementation, the processor 415 and the memory 420 may be included as part of a computing device 425 (such as the workstation 80 as discussed with respect to FIG. 1 or the computing device 341 as discussed with respect to FIG. 3). In another implementation, the processor 415 and the memory 420 may be associated with separate components or devices.

The signal diagram 400 may begin when field device A 405 generates (429) alert A. In embodiments, field device A 405 may generate alert A in response to various conditions, triggers, or the like within the process plant, as discussed herein. Alert A may be indicative of an operation(s) or condition(s) associated with the process control system, a component(s) thereof, or the field device 405 itself. Further, alert A may include or indicate various information, such as a type (e.g., "failed," "maintenance," "advisory," or "communication"), a degree of severity (e.g., "low," "medium," or "high"), and an identification of the source device (here, field device A 405). Field device A 405 may transmit (430) alert A to the processor 415, such as via the process control data highway 10.

The processor 415 may retrieve (432) a set of rules from the memory 420 that may be applicable to alert A. In embodiments, the processor 415 may examine alert A and may retrieve one or more rules that may be applicable to either alert A (or the information included therein), field device A 405, or both. Generally, a rule may specify how to manage or process a received alert, where managing or processing a received alert may include storing the received alert in a storage location (e.g., a container or folder) that may be specified by the rule.

The processor 415 may determine (434) if any of the rule(s) is applicable to alert A. In particular, a rule may be applicable to alert A if information of alert A matches the rule, if field device A 405 (i.e., the source of alert A) matches the rule, or both. For example, a rule may specify that any alert from field device A 405 should be directed to a storage location associated with alert suppression; in another example, a rule may specify that any high severity alert received from any field device should be directed to a storage location associated with high priority; and in a further example, a rule may specify that any high severity alert receive from field device A 405 should be directed to a storage location associated with communication generation. If there is no applicable rule ("NO"), processing may repeat, end, or proceed to other functionalities, such as to monitor for subsequent alerts.

If there is an applicable rule ("YES"), the processor 415 may provide (436) alert A to the memory 420 for storage. In embodiments, the rule that is applicable to alert A may specify a storage location (e.g., a particular folder or container) for alert A. Accordingly, the memory 420 may store (438) alert A in the specified storage location, where the specified storage location may or may not store additional alerts received from field device A 405 or from additional field device(s). According to embodiments, the storage of alert A, and/or additional alerts, in the memory 420 and may be physically and/or logically implemented.

The processor may further initiate (440) an applicable action associated with alert A, with the applicable rule, and/or with the storage of alert A. According to embodiments, a rule may specify one or more actions to initiate in association with storing an alert in a specified storage location. For example, an action may be to suppress alerts received from a certain device or a group of devices. In normal operation, any received alert may be indicated or presented in a user interface of a workstation, such as to enable an individual (e.g., a technician) to review the alert and assess any remedial actions. However, if an alert is suppressed, then the alert may be prevented from being presented in the user interface of the workstation, or may be presented separate from other alerts. In this example, any alert that is stored in a storage location associated with alert suppression may be suppressed from being presented. Similarly, an action may be to unsuppress alerts received from a certain device or a group of devices, such as for alerts that were previously suppressed. Accordingly, any alert that is stored in a storage location associated with alert unsuppression may be presented in a user interface of a workstation. In this example, any alerts that were previously suppressed may be presented in the user interface.

In another example, an action may be to send a notification (e.g., an email, text message, or other type of electronic communication) to a particular account or device, where the notification may indicate the alert as well as any information associated with the alert. Accordingly, any alert that is stored in a storage location associated with a notification generation may cause the processor 415 to generate a notification and transmit the notification to a specified recipient. For example, the specified recipient may be an email address, phone number, specific workstation or other electronic device, and/or the like. Accordingly, a recipient of the notification may review the notification and may assess what, if any, actions to take in response to the notification.

In a further example, an action may be to move an alert(s) from one storage location to another storage location. In particular, a rule may specify that storing an alert from a particular device in a specified storage location causes other alerts associated with the particular device to be relocated to the specified storage location. According to embodiments, a rule and/or its associated action may be applicable to a singular device (e.g., field device A 405) or to a group of devices. For example, a rule may specify that any low priority alert from any device of a particular node (for which there may be several devices) be stored in a storage location associated with alert suppression.

Additionally or alternatively to the functionality discussed herein, the signal diagram 400 details a scenario with field device B 410 generating (441) alert B. In embodiments, field device B 410 may generate alert B in response to various conditions, triggers, or the like within the process plant, as discussed herein. Alert B may be indicative of an operation(s) or condition(s) associated with the process control system, a component(s) thereof, or the field device 410 itself. Further, alert B may include or indicate various information, such as a type (e.g., "failed," "maintenance," "advisory," or "communication"), a degree of severity (e.g., "low," "medium," or "high"), and an identification of the source device (here, field device B 410). Field device B 410 may transmit (442) alert B to the processor 415, such as via the process control data highway 10.

The processor 415 may examine (444) alert B and determine if any rules (such as one of the rules retrieved in (432)) is applicable to alert B. In this particular scenario, it may be assumed that there is not an applicable rule. Accordingly, the processor 415 may determine (446) whether to create or generate a new rule. According to embodiments, the processor 415 may determine to create or generate a new rule based on alert B and the information thereof, the source device (i.e., field device B 410), or a combination thereof. In particular, the creation of a new rule may be based on an effectiveness resulting from suppressing (or unsuppressing) an alert, generating and sending a notification, relocating alerts, and/or other factors.

For example, alert B may be low severity and/or may be redundant to a previously-received alert from field device B 410. In this example, the processor 415 may determine that it may be beneficial to create a rule specifying that subsequent alerts from field device B 410 should be suppressed (i.e., should be moved to a storage location associated with alert suppression). As another example, alert B may specify a condition of field device B that may need immediate attention by a technician. In this example, the processor 415 may determine that it may be beneficial to create a rule specifying that a notification be generated (and/or that subsequent alerts from field device B 410 trigger a notification generation) and sent to the technician. It should be appreciated that additional examples are envisioned.

In another example, alert B may indicate that field device B 410 needs repair. In this example, the processor 415 may determine that it may be beneficial to create a rule specifying that subsequent alerts indicating that field device B 410 needs repair should be suppressed until a subsequent turn-around event (i.e., a scheduled occurrence to repair field device B 410). Thus, alert B and the subsequent alerts may be associated with a storage location that may be designated as repair. After the turnaround event (presumably to repair field device B 410), the processor 415 may cause the suppressed alerts to be removed or deleted.

If the processor 415 determines that a new rule is not needed ("NO"), processing may repeat, end, or proceed to other functionality, such as to monitor for subsequent alerts. If the processor 415 determines that a new rule is needed ("YES"), the processor 415 may generate (448) a new rule according to the analysis and determination of (446). Additionally, the processor 415 may provide (450) the new rule to the memory 420, and the memory 420 may store (452) the new rule. Thus, the processor 415 may retrieve or access the new rule from the memory 420 for analysis in association with any subsequently-received alerts, to determine how to manage the subsequently-received alerts.

Although not discussed with respect to FIG. 4, it should be appreciated that a user may access the computing device 425 to create a new rule or modify an existing rule. In particular, the user may specify what to do when an alert (or type of alert) is received from a specific device, including a storage location that should be associated with the alert and an action(s) to initiate.

Figure 5:
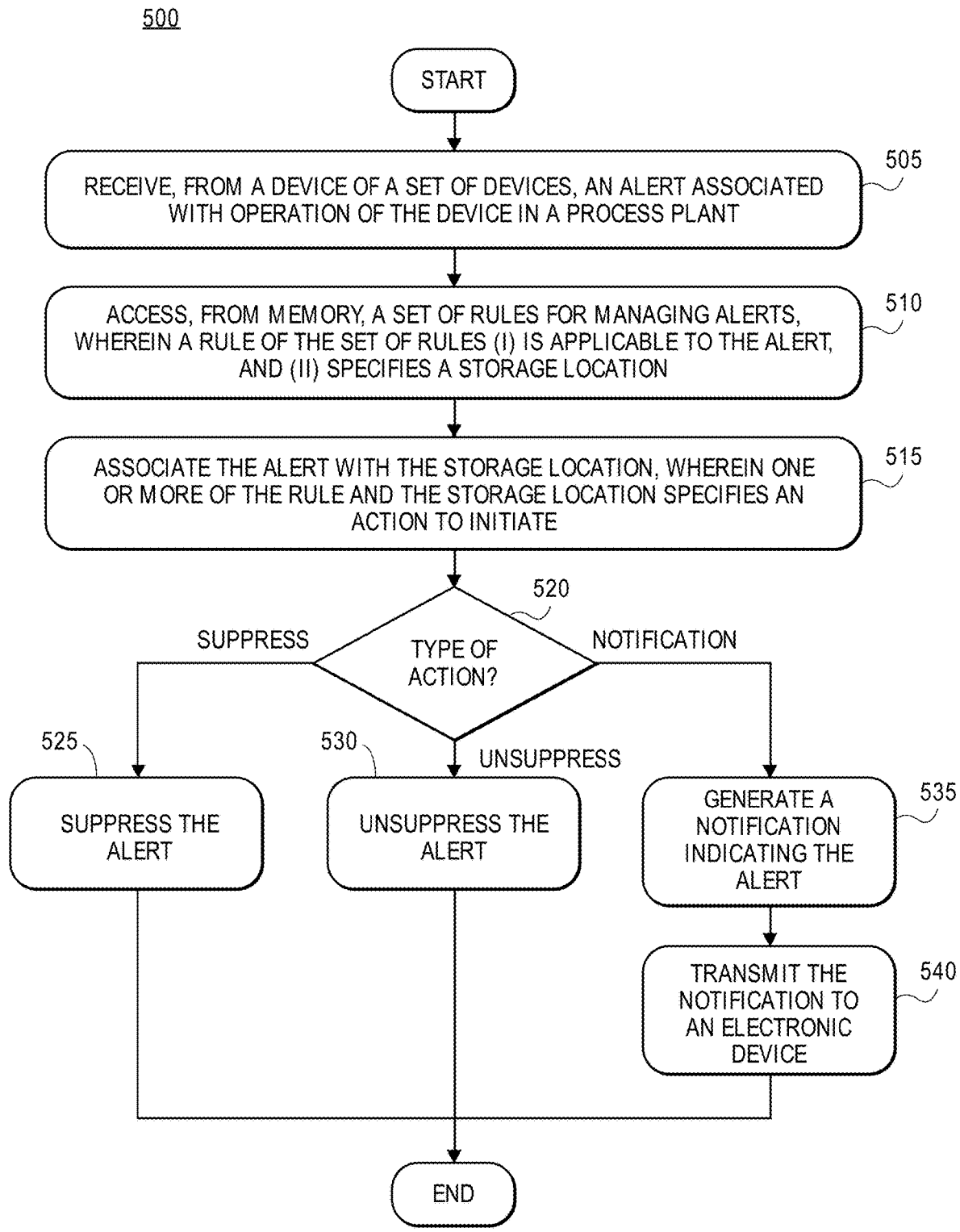
FIG. 5 is a flow diagram associated with managing alerts associated with a set of devices in a process plant, according to certain embodiments.

FIG. 5 depicts a block diagram of an example method 500 of managing alerts associated with a set of devices in a process plant, where at least some of the set of devices are communicatively connected to operate in the process plant during run-time to enable a process control system of the process plant to control a set of processes According to embodiments, the method 500 may be facilitated by a computing device (such as an operator workstation) configured with an application and configured to connect to and interface with the set of devices in the process plant. It should be appreciated that the functionalities of the method 500 are exemplary, and that additional or alternative functionalities are envisioned.

The method 500 may begin when the computing device receives (block 505), from a device of the set of devices, an alert associated with operation of the device in the process plant. In embodiments, the device may transmit the alert to the computing device in response to generating the alert. The computing device may access (block 510), from memory, a set of rules for managing alerts, wherein a rule of the set of rules (i) is applicable to the alert, and (ii) specifies a storage location. In embodiments, the alert may specify a degree of severity and/or the rule may indicate a specified device. Further, the computing device may identify the rule based on one or more of: the degree of severity of the alert matching a specified degree of severity of the rule, and the device matching the specified device of the rule.

The computing device may associate (block 515) the alert with the storage location, wherein one or more of the rule and the storage location specifies an action to initiate. In particular, associating the alert with the storage location may trigger a performance of a certain action, where the action itself may vary. In some particular scenarios, the action may relate to suppressing alerts, to unsuppressing alerts, to notifying of alerts, or to other actions. Thus, the computing device may determine (block 520) how to proceed based on a type of the action.

If the action relates to suppressing alerts ("SUPPRESS"), the computing device may suppress (block 525) the alert. In particular, the computing device may prevent or suppress the alert from being presented on a user interface, where the alert would otherwise be presented on the user interface. Thus, the alert and any other alert associated with the storage location may be prevented, at least temporarily, from being presented on a user interface.

If the action relates to unsuppressing alerts ("UNSUPPRESS"), the computing device may unsuppress (block 530) the alert. In particular, the computing device may cause the alert to be presented on a user interface, where the alert would otherwise be suppressed. In an implementation, the alert and any other alert associated with the storage location may be presented on the user interface.

If the action relates to a notification ("NOTIFICATION"), the computing device may generate (block 535) a notification indicating the alert. In particular, the notification may be any type of electronic communication, such a text message, email, or the like. The computing device may further transmit (block 540) the notification to an electronic device, where the electronic device may be internal to or external from the process plant. Thus, a user of the electronic device may review the notification and assess what action, if any, to undertake to address the alert.

Figure 6:
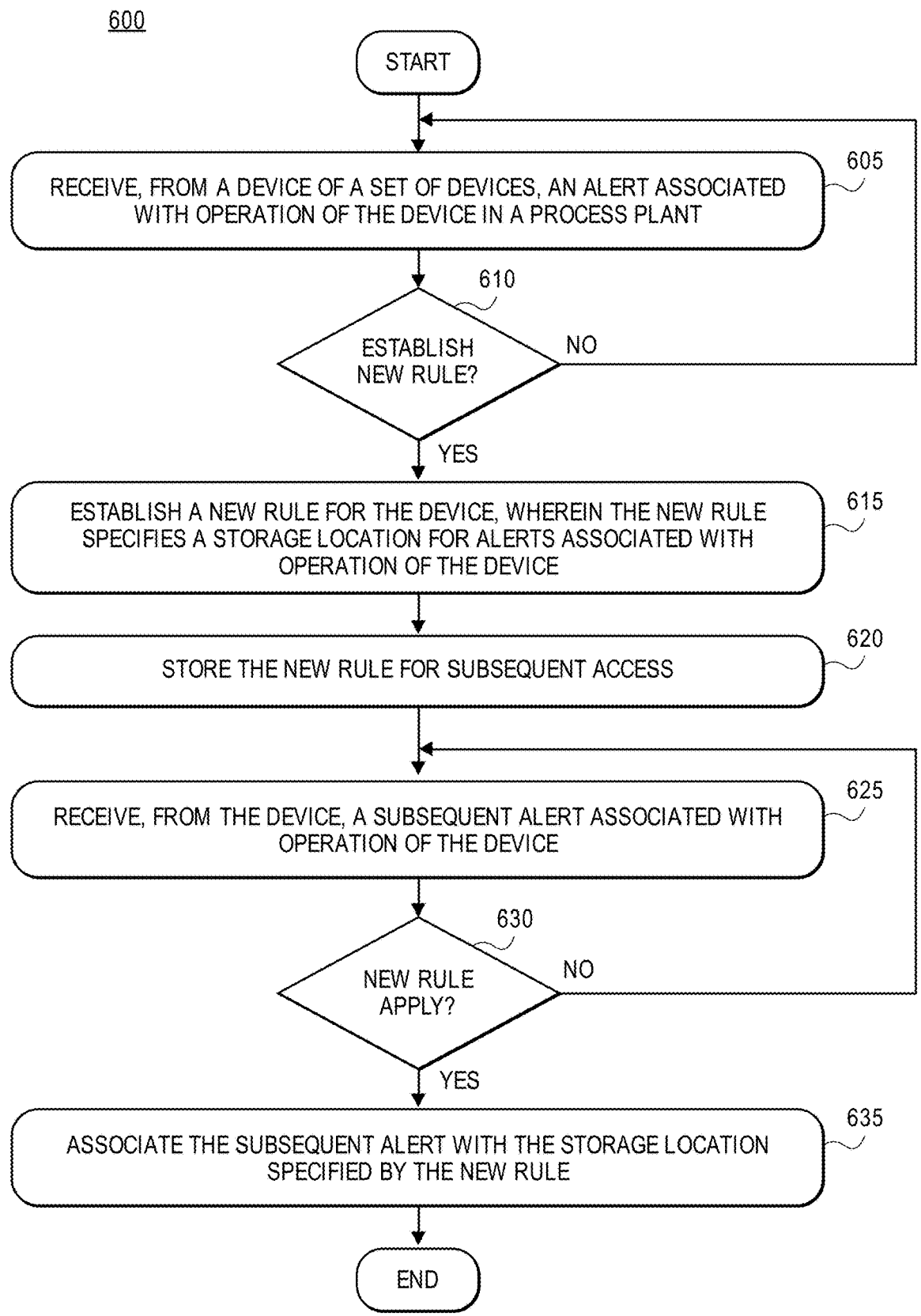
FIG. 6 is a flow diagram associated with generating rules for managing alerts associated with a set of devices in a process plant, according to certain embodiments.

FIG. 6 depicts a block diagram of an example method 600 of generating rules for managing alerts associated with a set of devices in a process plant, where at least some of the set of devices are communicatively connected to operate in the process plant during run-time to enable a process control system of the process plant to control a set of processes According to embodiments, the method 600 may be facilitated by a computing device (such as an operator workstation) configured with an application and configured to connect to and interface with the set of devices in the process plant. It should be appreciated that the functionalities of the method 600 are exemplary, and that additional or alternative functionalities are envisioned.

The method 600 may begin when the computing device receives (block 605), from a device of the set of devices, an alert associated with operation of the device in the process plant. In embodiments, the device may transmit the alert to the computing device in response to generating the alert. The computing device may determine (block 610) whether to establish a new rule. In embodiments, the determination may be based on the alert and/or the device. In an implementation, the alert may specify a degree of severity (e.g., "high priority"), and the computing device may determine that the degree of severity at least meets a threshold level and therefore that a new rule should be established. In another implementation, the computing device may determine to establish a new rule if a rule does not exist for the device. If the computing device determines to not establish a new rule ("NO"), processing may return to block 605, end, or proceed to other functionality. If the computing device determines to establish a new rule ("YES"), processing may proceed to block 615.

At block 615, the computing device may establish a new rule for the device, wherein the new rule may specify a storage location for alerts associated with operation of the device. In an implementation, such as if the alert has a degree of severity, the new rule may specify that subsequent alerts associated with operation of the device and having the degree of severity be associated with the storage location. In another implementation, the alert may indicate that the device needs repair, and the new rule may specify that subsequent alerts indicating that the device needs repair be associated with the storage location until a subsequent turnaround event.

In a further implementation, the new rule may specify an address (e.g., an email address or a phone number) to which to direct electronic communications indicating the alerts associated with operation of the device. In a still further implementation, the new rule may specify that work orders indicating the alerts associated with operation of the device be generated. The computing device may store (block 620) the new rule for subsequent access, such as when a subsequent alert is received.

The computing device may receive (block 625), from the device, a subsequent alert associated with operation of the device. After receiving the subsequent alert, the computing device may determine (block 630) whether the new rule applies. For example, if the new rule specifies that alerts from device A having a high priority be stored in a high priority folder, and the subsequent alert is a high priority alert from device A, then the computing device determines that the new rule applies. If the computing device determines that the new rule does not apply ("NO"), then processing may return to block 625 at which subsequent alerts may be monitored, or may end or proceed to other functionality.

If the computing device determines that the new rule applies ("YES"), then the computing device may associate (block 635) the subsequent alert with the storage location specified by the new rule. Accordingly, the subsequent alert may be stored in accordance with the new rule.

Figure 7:
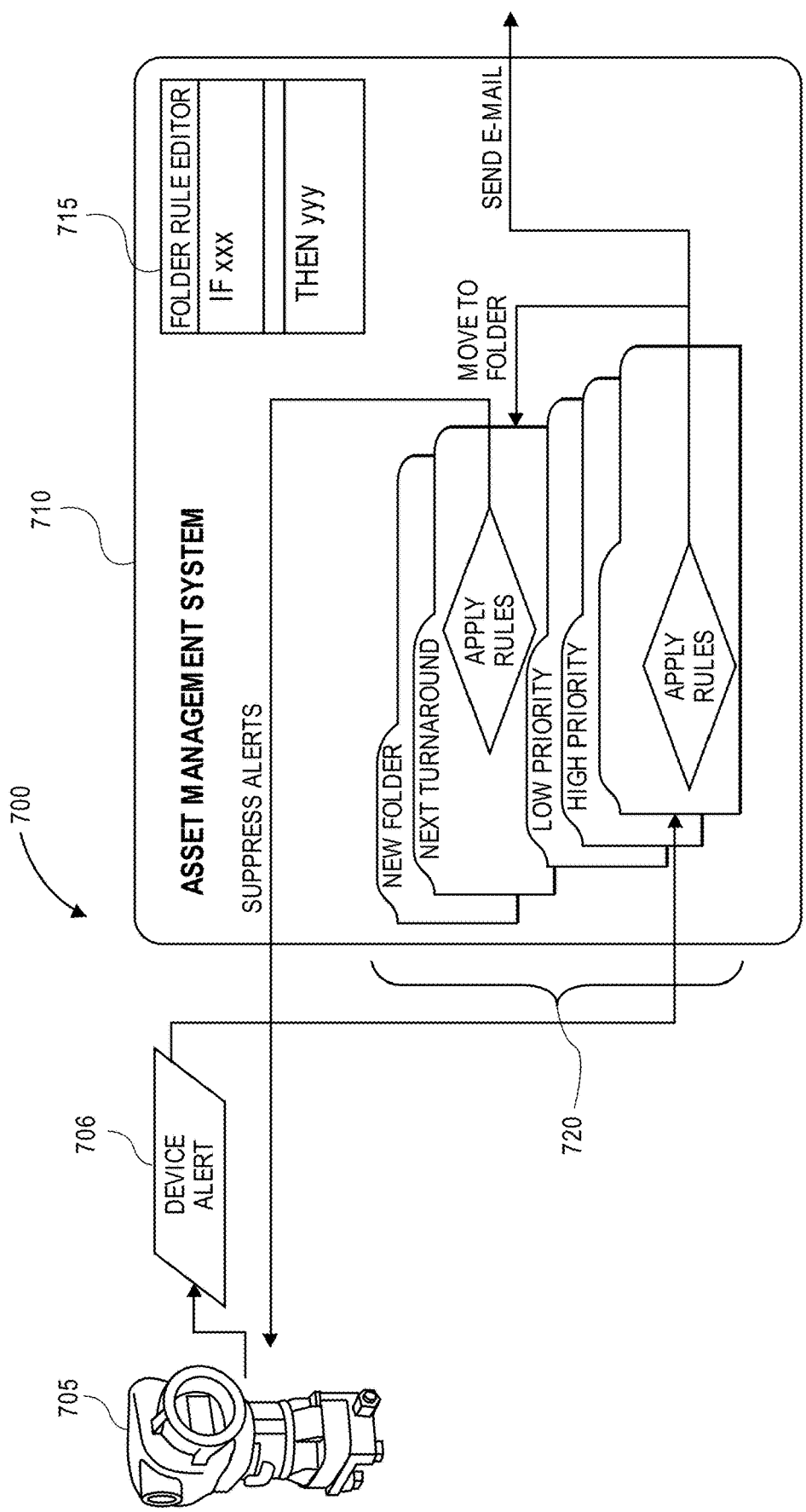
FIG. 7 is an illustration depicting various of the described functionalities, according to certain embodiments.

FIG. 7 is an illustration 700 depicting various of the functionalities associated with the present embodiments. The illustration 700 includes a device 705 (such as one of the field devices as discussed with respect to FIG. 1) in communication with an asset management system 710 which may be implemented on hardware and software of a computing device (such as the computing device 341 as discussed with respect to FIG. 3). The device 705 may generate and transmit a device alert 706 to the asset management system 710.

The asset management system 710 may implement a storage structure 720 for rules and alerts. According to embodiments, the storage structure 720 includes a set of storage locations (depicted as a set of folders) with which rules and/or alerts may be associated. For example, the set of storage locations includes "New Folder," "Next Turnaround," "Low Priority," "High Priority," and "Active Alert List." Each of the set of storage locations may have an associated action that may be undertaken when an alert is stored in the corresponding storage location. For example, any alert stored in the "Low Priority" folder may be suppressed from display on a user interface.

After receiving the device alert 706, the asset management system 710 may examine the device alert 706 and determine whether any rule(s) applies. Depending on whether a rule applies, the asset management system 710 may accordingly store the device alert 706 in an appropriate storage location. For example, the device alert 706 may be stored in the "Low Priority" folder, the "High Priority" folder, or another folder. The asset management system 710 may additional initiate any action associated with the appropriate storage location. For example, if the device alert 706 is added to the "Active Alert List" folder, then the asset management system 710 may generate and send an e-mail to an appropriate account.

The asset management system 710 may further include a folder rule editor 715. According to embodiments, a user may use the folder rule editor 715 to input a new rule (or modify an existing rule) that may have associated one of the storage locations of the storage structure 720. Using the folder rule editor 715, the user may specify what to do when an alert (or type of alert) is received from a specific device, including a storage location that should be associated with the alert and an action(s) to initiate.

Embodiments of the techniques described in the present disclosure may include any number of the following aspects, either alone or combination:

1. A computer-implemented method of managing alerts associated with a set of devices in a process plant, where at least some of the set of devices are communicatively connected to operate in the process plant during run-time to enable a process control system of the process plant to control a set of processes, the method comprising: receiving, at a computing device from a device of the set of devices, an alert associated with operation of the device in the process plant; accessing, from memory, a set of rules for managing alerts, wherein a rule of the set of rules (i) is applicable to the alert, and (ii) specifies a storage location; associating the alert with the storage location, wherein one or more of the rule and the storage location specifies an action to initiate; and in response to associating the rule with the storage location, initiating the action.

2. The computer-implemented method of claim 1, wherein initiating the action comprises: suppressing the alert from being presented on a user interface.

3. The computer-implemented method of claim 1, wherein initiating the action comprises: generating a notification indicating the alert; and transmitting the notification to an electronic device.

4. The computer-implemented method of claim 1, further comprising: receiving, at the computing device from the device, an additional alert associated with operation of the device in the process plant; determining that the rule applies to the additional alert; and in response to determining that the rule applies to the additional alert, associating the additional alert with the storage location.

5. The computer-implemented method of claim 1, wherein the alert specifies a degree of severity, and wherein accessing the set of rules for managing alerts comprises: identifying the rule from the set of rules, wherein the degree of severity of the alert matches a specified degree of severity of the rule.

6. The computer-implemented method of claim 1, wherein the alert specifies a degree of severity, and wherein accessing the set of rules for managing alerts comprises:

identifying the rule from the set of rules, wherein (i) the degree of severity of the alert matches a specified degree of severity of the rule, and (ii) the device matches a specified device of the rule.

7. The computer-implemented method of claim 1, wherein accessing the set of rules for managing alerts comprises: identifying the rule from the set of rules, wherein the device matches a specified device of the rule.

8. The computer-implemented method of claim 1, further comprising: determining that the alert has been associated with the storage location for at least a threshold amount of time; and in response to determining, initiating an additional action.

9. The computer-implemented method of claim 8, wherein initiating the additional action comprises: disassociating the alert with the storage location.

10. A management system for managing alerts associated with a set of devices in a process plant, the system communicatively connected to the set of devices, where at least some of the set of devices are communicatively connected to operate in the process plant during run-time to enable a process control system of the process plant to control a set of processes, comprising: a memory (i) at least partially segmented into a set of storage locations, and (ii) storing a set of rules for managing alerts; and a processor interfacing with the memory, and configured to: receive, from a device of the set of devices, an alert associated with operation of the device in the process plant, access the set of rules from the memory, wherein a rule of the set of rules (i) is applicable to the alert, and (ii) specifies a storage location of the set of storage locations, associate, in the memory, the alert with the storage location, wherein one or more of the rule and the storage location specifies an action to initiate, and in response to associating the rule with the storage location, initiate the action.

11. The management system of claim 10, wherein to initiate the action, the processor is configured to: suppress the alert from being presented on a user interface.

12. The management system of claim 10, wherein to initiate the action, the processor is configured to: generate a notification indicating the alert, and cause the notification to be transmitted to an electronic device.

13. The management system of claim 10, wherein the processor is further configured to: receive, from the device, an additional alert associated with operation of the device in the process plant, determine that the rule applies to the additional alert, and in response to determining that the rule applies to the additional alert, associate, in the memory, the additional alert with the storage location.

14. The management system of claim 10, wherein the alert specifies a degree of severity, and wherein to access the set of rules for managing alerts, the processor is configured to: identify the rule from the set of rules, wherein the degree of severity of the alert matches a specified degree of severity of the rule.

15. The management system of claim 10, wherein the alert specifies a degree of severity, and wherein to access the set of rules for managing alerts, the processor is configured to: identify the rule from the set of rules, wherein (i) the degree of severity of the alert matches a specified degree of severity of the rule, and (ii) the device matches a specified device of the rule.

16. The management system of claim 10, wherein to access the set of rules for managing alerts, the processor is configured to: identify the rule from the set of rules, wherein the device matches a specified device of the rule.

17. The management system of claim 10, wherein the processor is further configured to: determine that the alert has been associated with the storage location for at least a threshold amount of time, and in response to determining, initiate an additional action.

18. The management system of claim 17, wherein to initiate the additional action, the processor is configured to: disassociate the alert with the storage location.

19. A computer-implemented method of generating rules for managing alerts associated with a set of devices in a process plant, where at least some of the set of devices are communicatively connected to operate in the process plant during run-time to enable a process control system of the process plant to control a set of processes, the method comprising: receiving, at a computing device from a device of the set of devices, an alert associated with operation of the device in the process plant; determining, from the alert, that a new rule should be established for the device; establishing the new rule for the device, wherein the new rule specifies a storage location for alerts associated with operation of the device; receiving, at the computing device from the device, a subsequent alert associated with operation of the device; and after receiving the subsequent alert, associating the subsequent alert with the storage location specified by the new rule.

20. The computer-implemented method of claim 19, wherein the alert specifies a degree of severity, and wherein determining, from the alert, that the new rule should be established for the device comprises: determining that the degree of severity of the alert at least meets a threshold level.

21. The computer-implemented method of claim 20, wherein establishing the new rule for the device comprises: establishing the new rule for the device, wherein the new rule specifies that subsequent alerts associated with operation of the device and having the degree of severity be associated with the storage location.

22. The computer-implemented method of claim 19, wherein determining, from the alert, that the new rule should be established for the device comprises: determining that a rule does not exist for the device.

23. The computer-implemented method of claim 19, wherein the alert indicates that the device needs repair, and wherein establishing the new rule for the device comprises: establishing the new rule for the device, wherein the new rule specifies that subsequent alerts indicating that the device needs repair be associated with the storage location until a subsequent turnaround event.

24. The computer-implemented method of claim 19, wherein establishing the new rule for the device comprises: establishing the new rule for the device, wherein the new rule further specifies an address to which to direct electronic communications indicating the alerts associated with operation of the device.

25. The computer-implemented method of claim 19, wherein establishing the new rule for the device comprises: establishing the new rule for the device, wherein the new rule further specifies that work orders indicating the alerts associated with operation of the device be generated.

26. The computer-implemented method of claim 19, further comprising: storing the new rule for subsequent access.

27. The computer-implemented method of claim 19, wherein associating the subsequent alert with the storage location specified by the new rule comprises: determining that the new rule applies to the subsequent alert; and associating the subsequent alert with the storage location specified by the new rule.

28. A management system for managing alerts associated with a set of devices in a process plant, the system communicatively connected to the set of devices, where at least some of the set of devices are communicatively connected to operate in the process plant during run-time to enable a process control system of the process plant to control a set of processes, comprising: a memory (i) at least partially segmented into a set of storage locations, and (ii) storing a set of rules for managing alerts; and a processor interfaced with the memory, and configured to: receive, from a device of the set of devices, an alert associated with operation of the device in the process plant, determine, from the alert, that a new rule should be established for the device, establish the new rule for the device, wherein the new rule specifies a storage location for alerts associated with operation of the device, receive, from the device, a subsequent alert associated with operation of the device, and after receiving the subsequent alert, associate, in the memory, the subsequent alert with the storage location specified by the new rule.

29. The management system of claim 28, wherein the alert specifies a degree of severity, and wherein to determine, from the alert, that the new rule should be established for the device, the processor is configured to: determine that the degree of severity of the alert at least meets a threshold level.

30. The management system of claim 29, wherein the new rule specifies that subsequent alerts associated with operation of the device and having the degree of severity be associated with the storage location.

31. The management system of claim 28, wherein to determine, from the alert, that the new rule should be established for the device, the processor is configured to: determine that a rule does not exist for the device.

32. The management system of claim 28, wherein the alert indicates that the device needs repair, and wherein the processor establishes the new rule specifying that subsequent alerts indicating that the device needs repair be associated with the storage location until a subsequent turnaround event.

33. The management system of claim 28, wherein the new rule further specifies an address to which to direct electronic communications indicating the alerts associated with operation of the device.

34. The management system of claim 28, wherein the new rule further specifies that work orders indicating the alerts associated with operation of the device be generated.

35. The management system of claim 28, wherein the processor is further configured to: cause the memory to store the new rule for subsequent access.

36. The management system of claim 28, wherein to associate, the memory, the subsequent alert with the storage location specified by the new rule, the processor is configured to: determine that the new rule applies to the subsequent alert, and associate, in the memory, the subsequent alert with the storage location specified by the new rule.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., an operator workstation, a commissioning tool, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," "administrator," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A computer-implemented method of generating rules for managing alerts associated with a set of devices in a process plant, where at least some of the set of devices are communicatively connected to operate in the process plant during run-time to enable a process control system of the process plant to control a set of processes, the method comprising:
    receiving, at a computing device from a device of the set of devices, an alert associated with operation of the device in the process plant;
    determining, from the alert, that subsequent alerts associated with operation of the device should be suppressed;
    based on determining that subsequent alerts from the device should be suppressed, establishing a new rule for the device, wherein the new rule specifies a storage location for the subsequent alerts associated with operation of the device;
    receiving, at the computing device from the device, a subsequent alert associated with operation of the device; and
    after receiving the subsequent alert, associating the subsequent alert with the storage location specified by the new rule.

2. The computer-implemented method of claim 1, wherein determining, from the alert, that the new rule should be established for the device comprises:
    determining that a rule does not exist for the device.

3. The computer-implemented method of claim 1, wherein the alert indicates that the device needs repair, and wherein establishing the new rule for the device comprises:
    establishing the new rule for the device, wherein the new rule specifies that subsequent alerts indicating that the device needs repair be associated with the storage location until a subsequent turnaround event.

4. The computer-implemented method of claim 1, wherein establishing the new rule for the device comprises:
    establishing the new rule for the device, wherein the new rule further specifies an address to which to direct electronic communications indicating the alerts associated with operation of the device.

5. The computer-implemented method of claim 1, wherein establishing the new rule for the device comprises:
    establishing the new rule for the device, wherein the new rule further specifies that work orders indicating the alerts associated with operation of the device be generated.

6. The computer-implemented method of claim 1, further comprising:
    storing the new rule for subsequent access.

7. The computer-implemented method of claim 1, wherein associating the subsequent alert with the storage location specified by the new rule comprises:
    determining that the new rule applies to the subsequent alert; and
    associating the subsequent alert with the storage location specified by the new rule.

8. A management system for managing alerts associated with a set of devices in a process plant, the system communicatively connected to the set of devices, where at least some of the set of devices are communicatively connected to operate in the process plant during run-time to enable a process control system of the process plant to control a set of processes, comprising:
    a memory (i) at least partially segmented into a set of storage locations, and (ii) storing a set of rules for managing alerts; and
    a processor interfaced with the memory, and configured to:
        receive, from a device of the set of devices, an alert associated with operation of the device in the process plant,
        determine, from the alert, that subsequent alerts associated with operation of the device should be suppressed,
        based on determining that subsequent alerts from the device should be suppressed, establish a new rule for the device, wherein the new rule specifies a storage location for the subsequent alerts associated with operation of the device,
        receive, from the device, a subsequent alert associated with operation of the device, and
        after receiving the subsequent alert, associate, in the memory, the subsequent alert with the storage location specified by the new rule.

9. The management system of claim 8, wherein to determine, from the alert, that the new rule should be established for the device, the processor is configured to:
    determine that a rule does not exist for the device.

10. The management system of claim 8, wherein the alert indicates that the device needs repair, and wherein the processor establishes the new rule specifying that subsequent alerts indicating that the device needs repair be associated with the storage location until a subsequent turnaround event.

11. The management system of claim 8, wherein the new rule further specifies an address to which to direct electronic communications indicating the alerts associated with operation of the device.

12. The management system of claim 8, wherein the new rule further specifies that work orders indicating the alerts associated with operation of the device be generated.

13. The management system of claim 8, wherein the processor is further configured to:
cause the memory to store the new rule for subsequent access.

14. The management system of claim 8, wherein to associate, the memory, the subsequent alert with the storage location specified by the new rule, the processor is configured to:
determine that the new rule applies to the subsequent alert, and
associate, in the memory, the subsequent alert with the storage location specified by the new rule.

15. A non-transitory computer-readable storage medium having stored thereon a set of instructions, executable by a processor to manage alerts associated with a set of devices in a process plant, where at least some of the set of devices are communicatively connected to operate in the process plant during run-time to enable a process control system of the process plant to control a set of processes, the instructions comprising:
instructions for receiving, at a computing device from a device of the set of devices, an alert associated with operation of the device in the process plant;
instructions for determining, from the alert, that subsequent alerts associated with operation of the device should be suppressed;
instructions for, based on determining that subsequent alerts from the device should be suppressed, establishing a new rule for the device, wherein the new rule specifies a storage location for the subsequent alerts associated with operation of the device;
instructions for receiving, at the computing device from the device, a subsequent alert associated with operation of the device; and
instructions for, after receiving the subsequent alert, associating the subsequent alert with the storage location specified by the new rule.

16. The non-transitory computer-readable storage medium of claim 15, wherein the instructions for determining, from the alert, that the new rule should be established for the device comprise:
instructions for determining that a rule does not exist for the device.

17. The non-transitory computer-readable storage medium of claim 15, wherein the alert indicates that the device needs repair, and wherein the instructions for establishing the new rule for the device comprise:
instructions for establishing the new rule for the device, wherein the new rule specifies that subsequent alerts indicating that the device needs repair be associated with the storage location until a subsequent turnaround event.

18. The non-transitory computer-readable storage medium of claim 15, wherein the instructions for establishing the new rule for the device comprise:
instructions for establishing the new rule for the device, wherein the new rule further specifies an address to which to direct electronic communications indicating the alerts associated with operation of the device.

19. The non-transitory computer-readable storage medium of claim 15, wherein the instructions for establishing the new rule for the device comprise:
instructions for establishing the new rule for the device, wherein the new rule further specifies that work orders indicating the alerts associated with operation of the device be generated.

20. The non-transitory computer-readable storage medium of claim 15, wherein the instructions further comprise:
instructions for storing the new rule for subsequent access.

21. The non-transitory computer-readable storage medium of claim 15, wherein the instructions for associating the subsequent alert with the storage location specified by the new rule comprise:
instructions for determining that the new rule applies to the subsequent alert; and
instructions for associating the subsequent alert with the storage location specified by the new rule.

* * * * *